(12) United States Patent
Froc et al.

(10) Patent No.: US 9,136,971 B2
(45) Date of Patent: Sep. 15, 2015

(54) METHOD FOR CONFIGURING TRANSMISSION INTERFACES OF DEVICES COMMUNICATING VIA A BAND-PASS FILTER

(75) Inventors: Gwillerm Froc, Rennes Cedex (FR); Christophe Mangin, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 91 days.

(21) Appl. No.: 14/002,010

(22) PCT Filed: Feb. 20, 2012

(86) PCT No.: PCT/EP2012/052829
§ 371 (c)(1),
(2), (4) Date: Aug. 28, 2013

(87) PCT Pub. No.: WO2012/119848
PCT Pub. Date: Sep. 13, 2012

(65) Prior Publication Data
US 2013/0336657 A1    Dec. 19, 2013

(30) Foreign Application Priority Data
Mar. 9, 2011 (EP) .................................. 11157423

(51) Int. Cl.
*H04J 14/02* (2006.01)
(52) U.S. Cl.
CPC ......... *H04J 14/0227* (2013.01); *H04J 14/0257* (2013.01); *H04J 14/0267* (2013.01); *H04J14/0268* (2013.01); *H04J 14/0278* (2013.01); *H04J 14/0282* (2013.01); *H04J 14/0272* (2013.01)
(58) Field of Classification Search
CPC .............. H04J 14/0245; H04J 14/0246; H04J 14/0247; H04J 14/0249; H04J 14/025; H04J 14/0252; H04J 14/0227; H04J 14/0257; H04J 14/0267; H04J 14/0268; H04J 14/0278; H04J 14/0282; H04J 14/0272
USPC ......... 398/151, 156, 140, 141, 79, 33, 70, 71, 398/72, 66, 67, 68, 85
See application file for complete search history.

(56) References Cited

U.S. PATENT DOCUMENTS 5,479,082 A * 12/1995 Calvani et al. .................. 398/85
7,433,594 B2 * 10/2008 Takachio et al. ................. 398/4

(Continued)

OTHER PUBLICATIONS

Mayweather, Derek et al., "Wavelength Tracking of a Remote WDM Router in Passive Optical Network", IEEE Photonics Technology Letters, vol. 8, No. 9, XP011048332, (Sep. 1996).

(Continued)

*Primary Examiner* — M. R. Sedighian
(74) *Attorney, Agent, or Firm* — Oblon, McClelland, Maier & Neustadt, L.L.P.

(57) ABSTRACT

A method configuring an optical transmission interface of at least one first device transmitting optical signals on a path to a second device on a carrier wavelength substantially equal to a nominal wavelength of an optical band-pass filter present on the path, each first device including an optical reception interface to enable receiving optical signals from the second device, the second device including an optical reception interface to enable receiving optical signals output by the first optical band-pass filter and transmitted by any first device on a carrier wavelength substantially equal to the nominal wavelength, the optical transmission interface of each first device being initially configured for transmitting optical signals on a first carrier wavelength.

15 Claims, 5 Drawing Sheets

(56) References Cited

U.S. PATENT DOCUMENTS

2009/0169207 A1* 7/2009 Absillis ........................... 398/58
2010/0158520 A1* 6/2010 Han et al. ....................... 398/58
2011/0123193 A1* 5/2011 Yamanaka et al. .............. 398/45

OTHER PUBLICATIONS

International Search Report Issued May 10, 2012 in PCT/EP12/52829 Filed Feb. 20, 2012.

* cited by examiner

METHOD FOR CONFIGURING TRANSMISSION INTERFACES OF DEVICES COMMUNICATING VIA A BAND-PASS FILTER

The present invention generally relates to optical networks and more particularly to configuring the carrier wavelength to be used by a first device to communicate with a second device, when an optical band-pass filter is present on the path from the first device to the second device, the nominal wavelength of the filter being a priori unknown by the first and second devices.

Optical networks, and more particularly passive optical networks, are increasingly used to give network access to residential or office gateways or to ensure mobile backhauling for instance.

In an attempt to increase the number of users to be served by one access equipment to the network, wavelength or frequency division multiplexing technologies have been developed. These technologies take advantage of multiplexing several optical signals using different carrier wavelengths or frequencies on a single optical fiber. Even though some user terminals may share the same carrier wavelength or frequency, a wavelength or frequency splitter is typically used to separate the different wavelengths, or frequencies, in order to increase the number of simultaneous optical transmissions. The wavelength or frequency splitter is typically placed between the user terminals and a terminal providing access to the rest of the network. For instance this latter terminal provides access to a core network. Different techniques can be used to achieve the wavelength or frequency splitting. We can cite thin films based systems, interference cavities as AWG (Array Wavelength Gratings) and FBG (Fiber Bragg Gratings).

The wavelength or frequency splitter then comprises several optical band-pass filters, for each direction of communications. It is used to filter and combine optical signals issued by the user terminals toward the terminal giving access to the core network. In the other direction, it is used to filter and spectrally split the optical signals issued by the terminal giving access to the core network.

The difficulty in such an arrangement is to configure the transmission interfaces of the terminals. Indeed, these transmission interfaces shall be configured so that the carrier wavelengths, or frequencies, effectively used are substantially equal to the nominal wavelengths or frequencies of the respective optical band-pass filters with which they are associated.

It is known that such wavelength or frequency splitters are used in a temperature-controlled environment. This allows insuring the stability of the nominal wavelengths or frequencies of the optical band-pass filters. Otherwise, the nominal wavelengths or frequencies of the optical band-pass filters would vary as a function of the temperature. This known technique however requires that the wavelength or frequency splitters be powered, or placed in an environment in which the temperature is controlled (e.g. air conditioned place) or in an athermanous (also referred to as athermal) package. For flexibility in the network deployment, cost and maintenance considerations, it is desirable to get rid of this constraint.

It can in addition be noticed that the terminals are also subject to similar variations of their transmission configurations, as a function of the temperature, when they are not in such temperature-controlled environments.

It can in addition be noticed that the terminals may also not be aware of the carrier wavelengths effectively used for given configurations of their respective transmission interfaces. Indeed, each terminal uses a set of configuration parameters that may not be indicative of the carrier wavelengths effectively used. Modifying this set of configuration parameters involves modifying the carrier wavelength, but with no indication of the effective value of the carrier wavelength.

It is desirable to overcome the aforementioned problems which occur in optical networks. In particular, it is desirable to provide a solution that allows configuring the optical transmission interfaces of devices communicating via an optical band-pass filter for which the nominal wavelength or frequency is a priori unknown. It is also desirable to provide a solution that allows configuring the optical transmission interfaces of devices communicating via an optical band-pass filter for which the nominal wavelength or frequency are temperature dependent.

It is also desirable to provide a solution that allows configuring the optical transmission interfaces of devices, communicating via an optical band-pass filter, for which the effective carrier wavelengths used when configuring said transmission interfaces are unknown. It is also desirable to provide a solution that allows configuring the optical transmission interfaces of devices, communicating via an optical band-pass filter, for which the effective carrier wavelengths for given respective configurations is temperature dependent.

It is furthermore desirable to provide a solution that allows efficiently configuring these optical transmission interfaces.

It is furthermore desirable to provide a solution that allows easily configuring these optical transmission interfaces.

It is furthermore desirable to provide a solution that allows rapidly configuring these optical transmission interfaces.

It is furthermore desirable to provide a cost-effective solution to the aforementioned problems.

To that end, the present invention concerns a method for configuring an optical transmission interface of at least one first device for transmitting optical signals on at least one respective path to a second device on a carrier wavelength substantially equal to the nominal wavelength of a first optical band-pass filter present on said path(s), each first device having an optical reception interface configured to enable receiving optical signals from the second device, the second device having an optical reception interface configured to enable receiving optical signals output by said first optical band-pass filter and transmitted by any first device on a carrier wavelength substantially equal to said nominal wavelength, the transmission interface of each first device being initially configured for transmitting optical signals on a first carrier wavelength. The method is such that the second device performs the steps of:

transmitting signature messages to the first device(s);
transmitting an acknowledgement to each response message received in response to the transmitted signature messages;

and each first device performs the steps of:
receiving at least one signature message from the second device;
transmitting, to the second device, a response message to each received signature message;
reconfiguring its optical transmission interface for transmitting optical signals on another carrier wavelength, when said first device doesn't receive from the second device an acknowledgement between two receptions of signature messages.

Thus, each first device reconfigures its optical transmission interface until it receives an acknowledgement from the second device. When such an acknowledgement is received by a first device, it means that the second device has received the response message transmitted by the first device. Therefore, it means that the response message has been transmitted on a carrier wavelength that is substantially equal to the nominal wavelength of the first optical band-pass filter on the path from the first device to the second device, and that a suitable configuration of the optical transmission interface of the first device has been found.

Thus, a reliable configuration of the first device(s) can be easily and efficiently obtained, whereas the nominal wavelength of the first optical band-pass filter is a priori unknown, which is especially the case when this nominal wavelength varies as a function of the temperature.

In addition, a reliable configuration of the first device(s) can be easily and efficiently obtained, whereas their transmission configuration may also vary with the temperature. In other words, a reliable configuration of such a first device can be easily and efficiently obtained, whereas the carrier wavelength effectively used when configuring its optical transmission interface is unknown, which is especially the case when this effective carrier wavelength varies as a function of the temperature for a given configuration of the optical transmission interface.

The proposed solution is therefore cost-effective, as it doesn't require control of the absolute temperature of the devices and filters, or of their environment, and it allows using filters that are not powered. The proposed solution is also cost-effective, as it lowers the complexity of mechanical or electromechanical control of the nominal wavelength of the filter and/or of the effective carrier wavelength used by the first devices.

According to a particular feature, the second device performs a step of transmitting an indication of a collision of response messages, when said second device detects said collision, and each first device that has not received an acknowledgement between two receptions of signature messages performs a step of transmitting the next response message without reconfiguring its optical transmission interface.

Thus, when a collision is detected, a first device that has not received an acknowledgement between two receptions of signature messages doesn't know whether its response message was involved in the detected collision. If its response message is involved in the detected collision, it means that its optical transmission interface is configured for transmitting optical signals on a carrier wavelength that is substantially equal to the nominal wavelength of the optical band-pass filter on the path from the first device to the second device. Thus, by performing another transmission of the response message without modifying the configuration of the optical transmission interface of the concerned first device, a reliable configuration can be found more rapidly.

According to a particular feature, the second device transmits in a single acknowledgement message a plurality of acknowledgements to respective response messages.

Thus, the time period between two signature messages can be shortened and a reliable configuration of the first device(s) can be found more rapidly.

According to a particular feature, each transmission of a signature message corresponds to the starting point of a cycle, each cycle is divided into time slots, and each response message to said signature message is transmitted during a predetermined time slot.

Thus, the probability of collisions of response messages can be reduced and the reliable configuration of the first device(s) can be found more rapidly.

According to a particular feature, the second device performs at least one of the following steps:
  decreasing the number of time slots of at least one following cycle according to the number of received responses;
  increasing the number of time slots of at least one following cycle, when the second device detects a collision between response messages.

Thus, in the first case, the time period between two signature messages can be shortened and a reliable configuration of the first device(s) can be found even more rapidly.

Thus, in the second case, the probability of collisions of response messages can be reduced and a reliable configuration of the first device(s) can be found even more rapidly.

According to a particular feature, once a first device has received an acknowledgement to its response message, said first device performs the steps of:
  transmitting messages to the second device;
  receiving an information related to optical signals energy level detected by the second device when receiving said messages;
  deciding whether reconfiguring its optical transmission interface for transmitting optical signals on yet another carrier wavelength, on the basis of the received information.

Thus, when the optical transmission interface of the concerned first device is configured for transmitting optical signals on a carrier wavelength substantially equal to the nominal wavelength of the first optical band-pass filter, the first and second devices can exchange information. This allows refining the configuration of the concerned first device. A more reliable configuration of the concerned first device may thus be found. In addition, it allows the concerned first device adapting its configuration following variations of temperature.

According to a particular feature, a second optical band-pass filter being present on the path(s) from the second device to the first device(s), the second device having an optical transmission interface configured for transmitting optical signals on a carrier wavelength substantially equal to the nominal wavelength of said second band-pass filter, the second device performs the steps of, once the second device has received a response message from a slave device:
  transmitting messages to said first device;
  receiving an information related to optical signals energy level detected by said first device when receiving said messages;
  deciding whether reconfiguring its optical transmission interface for transmitting optical signals on another carrier wavelength, on the basis of the received information.

Thus, when the transmission interface of the second device is configured for transmitting optical signals on a carrier wavelength substantially equal to the nominal wavelength of the second optical band-pass filter and when the transmission interface of at least one first device is configured for transmitting optical signals on a carrier wavelength substantially equal to the nominal wavelength of the first optical band-pass filter, this first device and the second device can exchange information. This allows refining the configuration of the second device. A more reliable configuration of the second device may thus be found. In addition, it allows the second device adapting its configuration following variations of temperature.

According to a particular feature, said information consists in indicating whether said optical signals energy level increased, decreased or were stable when comparing the optical signals energy level detected when receiving one message and the signals energy level detected when receiving one preceding message.

Thus, the transmission of a simple and cost-effective information allows the first(s) and/or second devices to find a more reliable configuration of their respective optical transmission interfaces.

According to a particular feature, a second optical band-pass filter being present on the path(s) from the second device to the first device(s), the second device having an optical transmission interface initially configured for transmitting optical signals on a second carrier wavelength, the second device performs the steps of:
  checking whether a predetermined number of signature messages transmitted to the first device(s) is reached;
  and in case of positive result of the checking step:
    reconfiguring its optical transmission interface for transmitting optical signals on another carrier wavelength and transmitting at least one signature message via its reconfigured optical transmission interface.

Thus, the second device reconfigures its optical transmission interface until it receives a response message from at least one first device. When such a response message is received, it means that at least one first device has received the signature message transmitted by the second device. Therefore, it means that the signature message has been transmitted on a carrier wavelength that is substantially equal to the nominal wavelength of the second optical band-pass filter on the path(s) from the second device to the first device(s). It means that a suitable configuration of the optical transmission interface of the second device has been found.

Thus, a reliable configuration of the second device can be easily and efficiently obtained, whereas the nominal wavelength of the second optical band-pass filter is a priori unknown, which is especially the case when this nominal wavelength varies as a function of the temperature.

In addition, a reliable configuration of the second device can be easily and efficiently obtained, whereas their transmission configuration may also vary with the temperature. In other words, a reliable configuration of the second device can be easily and efficiently obtained, whereas the carrier wavelength effectively used when configuring its optical transmission interface is unknown, which is especially the case when this effective carrier wavelength varies as a function of the temperature for a given configuration of the optical transmission interface.

According to a particular feature, a second optical band-pass filter being present on the path(s) from the second device to the first device(s), the second device having an optical transmission interface to be configured for transmitting optical signals to said first device(s), the second device performs the steps of:
  determining a configuration for transmitting optical signals on a wavelength substantially equal to the nominal wavelength of a third optical band-pass filter on a path from the second device to a third device;
  configuring its optical transmission interface on the basis of the determined configuration and of a predetermined spectral distance between the nominal wavelength of said second optical band-pass filter and the nominal wavelength of said third optical band-pass filter.

Thus, from the knowledge of a configuration suitable for the third optical band-pass filter, the second device is therefore able to easily, efficiently and rapidly configure its optical transmission interface for transmitting optical signals on a carrier wavelength that is substantially equal to the nominal wavelength of the second optical band-pass filter.

The present invention also concerns a system for configuring an optical transmission interface of at least one first device for transmitting optical signals on at least one respective path to a second device on a carrier wavelength substantially equal to the nominal wavelength of a first optical band-pass filter present on said path(s), each first device having an optical reception interface configured to enable receiving optical signals from the second device, the second device having an optical reception interface configured to enable receiving optical signals output by said first optical band-pass filter and transmitted by any first device on a carrier wavelength substantially equal to said nominal wavelength, the optical transmission interface of each first device being initially configured for transmitting optical signals on a first carrier wavelength, the system comprising said first device(s) and said second device. The system is such that the second device comprises:
  means for transmitting signature messages to the first device(s);
  means for transmitting an acknowledgement to each response message received in response to the transmitted signature messages;
  and each first device comprises:
  means for receiving at least one signature message from the second device;
  means for transmitting, to the second device, a response message to each received signature message;
  means for reconfiguring its optical transmission interface for transmitting optical signals on another carrier wavelength, said means being implemented when said first device doesn't receive from the second device an acknowledgement between two receptions of signature messages.

The present invention also concerns a method for configuring an optical transmission interface of a first device for transmitting optical signals on a path to a second device on a carrier wavelength substantially equal to the nominal wavelength of a first optical band-pass filter present on said path, the first device having an optical reception interface configured to enable receiving optical signals from the second device, the optical transmission interface of the first device being initially configured for transmitting optical signals on a carrier wavelength. The method is such that the first device performs the steps of:
  receiving at least one signature message from the second device;
  transmitting, to said second device, a response message to each received signature message;
  reconfiguring its optical transmission interface for transmitting optical signals on another carrier wavelength, when the first device doesn't receive from the second device an acknowledgement to a response message between two receptions of signature messages.

The present invention also concerns a device, called first device, having an optical transmission interface to be configured for transmitting signals on a path to a second device on a carrier wavelength substantially equal to the nominal wavelength of an optical band-pass filter present on said path, the first device having an optical reception interface configured to enable receiving signals from said second device, the optical transmission interface of the first device being initially configured for transmitting optical signals on a carrier wavelength. The first device is such that it comprises means for:
  receiving at least one signature message from said second device;
  transmitting, to said second device, a response message to each received signature message;
  reconfiguring its optical transmission interface for transmitting optical signals on another carrier wavelength, when the first device doesn't receive from said second device an acknowledgement to a response message between two receptions of signature messages.

The present invention also concerns a method for configuring an optical transmission interface of at least one first device for transmitting optical signals on at least one respective path to a second device on a carrier wavelength substantially equal to the nominal wavelength of an optical band-pass filter present on said path(s), the second device having an optical reception interface configured to enable receiving optical signals output by said first optical band-pass filter and transmitted by any first device on a carrier wavelength substantially equal to said nominal wavelength. The method is such that the second device performs the steps of:

transmitting signature messages to the first device(s);
transmitting an acknowledgement to each response message received in response to the transmitted signature messages.

The present invention also concerns a device, called second device, for configuring an optical transmission interface of at least one first device for transmitting optical signals on at least one respective path to the second device on a carrier wavelength substantially equal to the nominal wavelength of an optical band-pass filter present on said path(s), the second device having an optical reception interface configured to enable receiving optical signals output by said optical band-pass filter and transmitted by any first device on a carrier wavelength substantially equal to said nominal wavelength. The second device is such that it comprises:

means for transmitting signature messages to the first device(s).
means for transmitting an acknowledgement to each response message received in response to the transmitted signature messages.

The present invention also concerns a computer program that can be downloaded from a communication network and/or stored on a medium that can be read by a computer and run by a processor. This computer program comprises instructions for implementing the aforementioned methods in any one of their various embodiments, when said program is run by the processor.

The present invention also concerns an information storage means, storing a computer program comprising a set of instructions that can be run by a processor for implementing the aforementioned methods in any one of their various embodiments, when the stored information is read by a computer and run by a processor.

The characteristics of the invention will emerge more clearly from a reading of the following description of an example of embodiment, said description being produced with reference to the accompanying drawings, among which.

Figure 1:
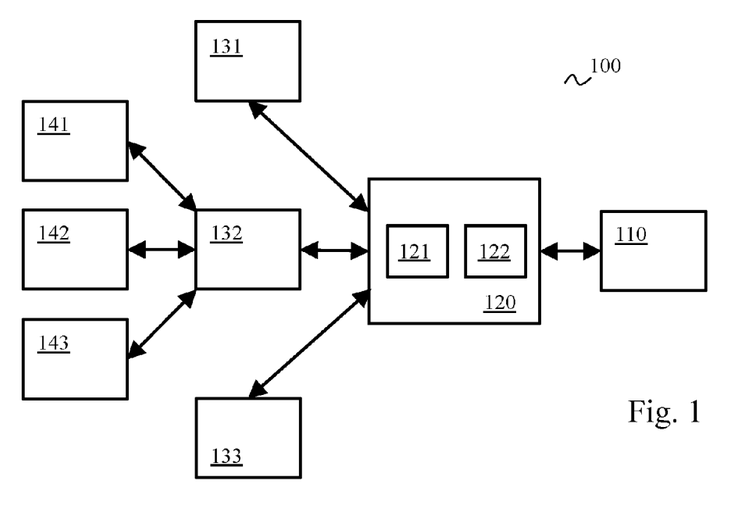
FIG. 1 schematically represents an architecture of a passive optical network in which the present invention may be implemented.

FIG. 1 schematically represents an architecture of a passive optical network in which the present invention may be implemented.

It has to be noticed that, since wavelength and frequency are tied together through a direct inverse relationship, these two terms are indifferently used by the one skilled in the art, as they refer to the same concept.

The description hereafter is detailed in the context of a passive optical network, but can be similarly applied in the more general context of optical networks.

The passive optical network 100 comprises a master device 110, a plurality of slave devices 141, 142, 143, and a spectral splitter device 120. The slave devices 141, 142, 143 are interconnected with the master device 110 via the spectral splitter device 120. Power splitters, as described hereafter, may be placed between the slave devices and the spectral filter device 120 in order to increase the number of slave devices that can be interconnected with the master device 110. All the interconnections of the passive optical network 100 are performed by using optical fiber.

In the context of the passive optical network 100, the slave devices 141, 142, 143 are of ONU (Optical Network Units) type. ONUs are typically intended to be located at the end-user household.

In the context of the passive optical network 100, the master device 110 is of OLT (Optical Line Terminal) type. It enables ONUs to access a core network (not shown).

The slave devices 141, 142, 143 may be connected to the spectral splitter device 120 via a power splitter device 132. The power splitter device 132 is a passive splitter that separates the input signal, in the downlink direction, into a plurality of corresponding signals which power is divided by the number of links towards the slave devices 141, 142, 143. The signals output by the power splitter device 132, on each link in the downlink direction, contain the same information as the input signal, the power splitter device 132 having only impact on the power of the signals.

Other slave devices may be connected to the spectral splitter device 120 via power splitter devices 131, 133. Each power splitter device 131, 132, 133, and the slave devices connected to, form a network of PON (Passive Optical Network) type with the OLT. The PONs operate on respective wavelength bands, as filtered by the spectral splitter device 120. To achieve this, the spectral splitter device 120 comprises a pair of optical band-pass filters for each PON, aiming at filtering respective wavelength bands, and thus enabling the spectral splitter device 120 to perform Wavelength Division Multiplexing.

Therefore, as shown on FIG. 1, the spectral splitter device 120 comprises optical band-pass filters 121 and 122 dedicated to the transmissions over the PON of the power splitter device 132 and its associated slave devices 141, 142, 143. The first filter 122, called hereinafter uplink filter, is in charge of filtering the optical signals in the uplink direction, i.e. from the slave devices 141, 142, 143 to the master device 110. The second filter 121, called hereinafter downlink filter, is in charge of filtering the optical signals in the downlink direction, i.e. from the master device 110 to the slave devices 141, 142, 143. Each filter 121, 122 is a band-pass filter defined by a nominal wavelength, also referred to as centre wavelength, as well as a bandwidth.

For a considered uplink or downlink direction, all the filters of the spectral splitter device 120 have preferably the same bandwidth value and are preferably spaced by a fixed spectral distance. However, the nominal wavelengths of the filters are a priori unknown. The spectral splitter device 120 being preferably passive, the nominal wavelengths of the filters may vary as a function of the temperature of the spectral splitter device 120. Typically, for a temperature in a range from −40° C. to 80° C., the nominal wavelength may vary by ±0.6 nm, which corresponds to a frequency drift over a frequency band of approximately 200 GHz.

It has to be noticed that, the band-pass filters being designed upon the same constraints, the bandwidth value of the filters and the spectral distance between the filters are substantially independent of the temperature variations.

In addition, the effective carrier wavelength corresponding to a given configuration of the optical transmission interface of either a slave device 141, 142, 143 or the master device 110 may not be known.

Therefore, the slave devices 141, 142, 143 need to be configured for transmitting optical signals in the uplink direction on carrier wavelengths that are substantially equal to the nominal frequency of the uplink filter 122. In addition, the master device 110 needs to be configured for transmitting optical signals in the downlink direction on a carrier wavelength that is substantially equal to the nominal frequency of the downlink filter 121.

It can be noticed that a wavelength in the passband of a given filter is considered as substantially equal to the nominal frequency of said given filter.

It can be noted that the nominal wavelengths of the filters 121, 122 may be identical. It means that either a same carrier wavelength or different carrier wavelengths can be used in the downlink and uplink directions.

Figure 4:
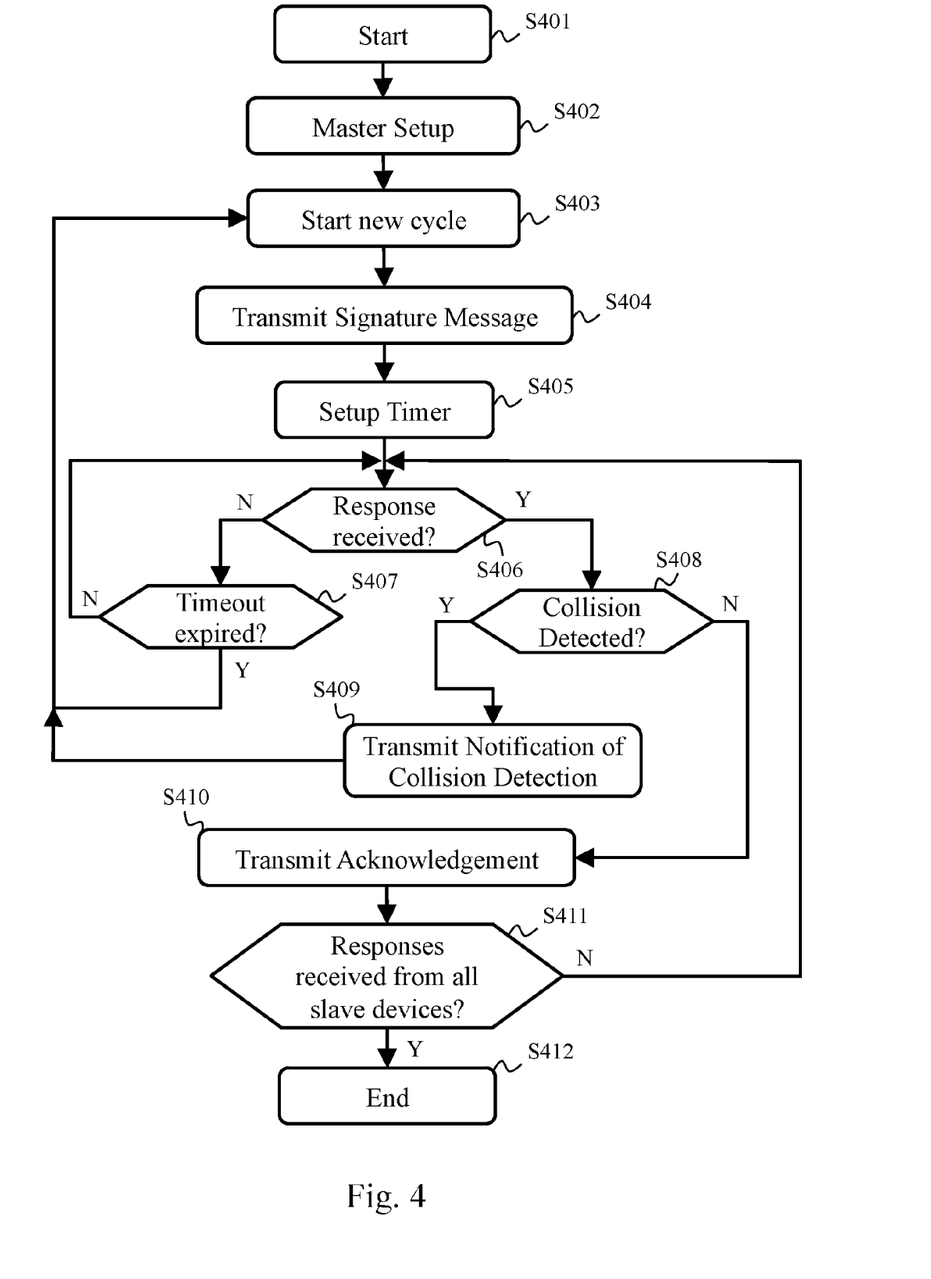
FIG. 4 schematically represents an algorithm, performed by the master device during the main configuration phase, for coarsely determining configurations of optical transmission interfaces of slave devices of the optical network, corresponding to respective carrier wavelengths to be used by said slave devices.
Figure 5:
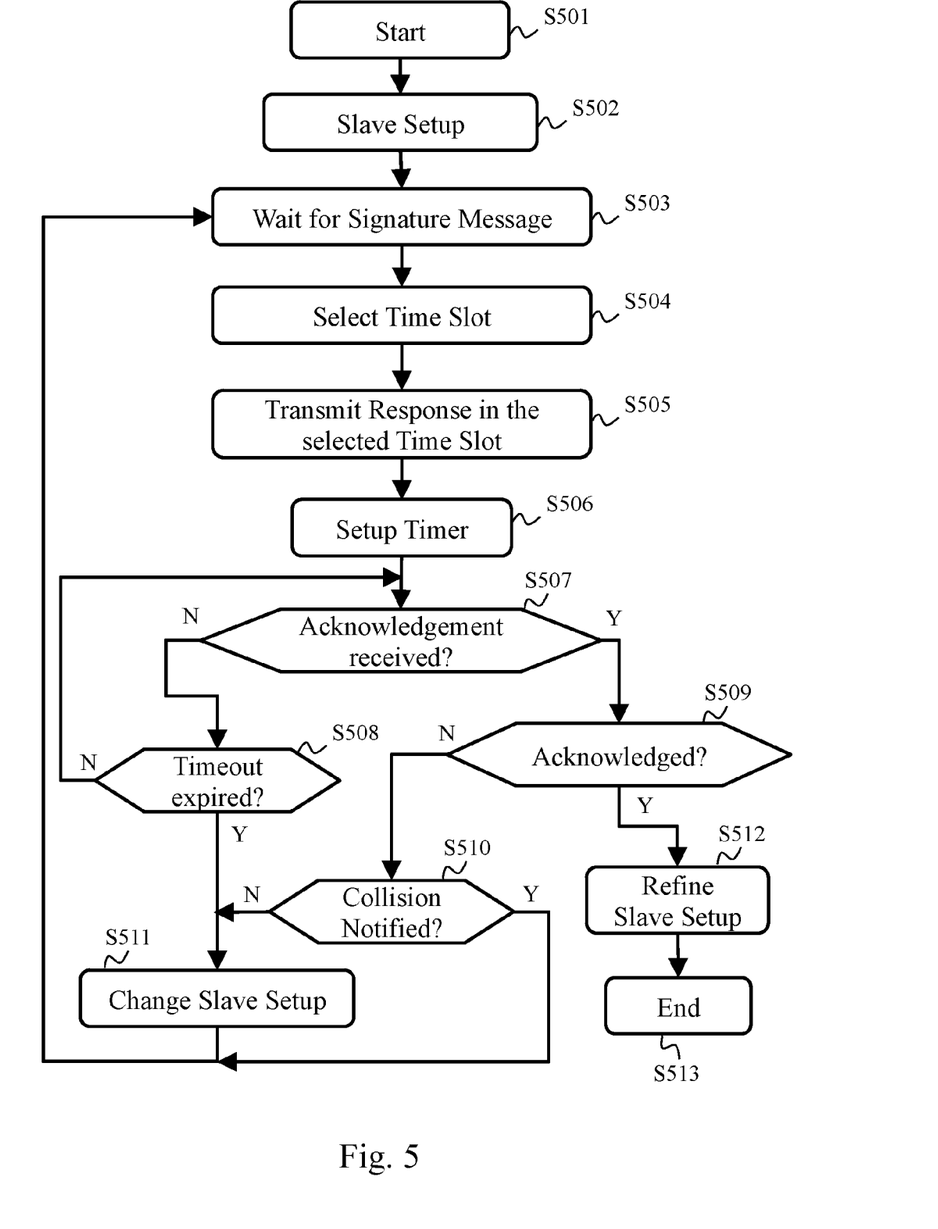
FIG. 5 schematically represents an algorithm performed by the slave devices in correspondence to the algorithm of FIG. 4.

To achieve this, it is proposed to perform a main configuration phase, as detailed hereafter with regard to FIGS. 4 and 5. This main configuration phase aims at determining a configuration of the slave devices 141, 142, 143 for transmitting optical signals in the uplink direction on carrier wavelengths that are substantially equal to the nominal frequency of the uplink filter 122. The main configuration phase may be preceded by a preliminary configuration phase aiming at determining a configuration of the master device 110 for transmitting optical signals in the downlink direction on a carrier wavelength that is substantially equal to the nominal frequency of the downlink filter 121, as detailed hereafter with regard to FIG. 8.

The main configuration phase is typically implemented when at least one ONU is initialized and joins a PON, whereas the preliminary configuration phase is typically implemented when the OLT is initialized. Indeed, ONUs may be frequently powered off then on, whereas the OLT is typically always powered on, unless some maintenance operation is required.

Figure 2:
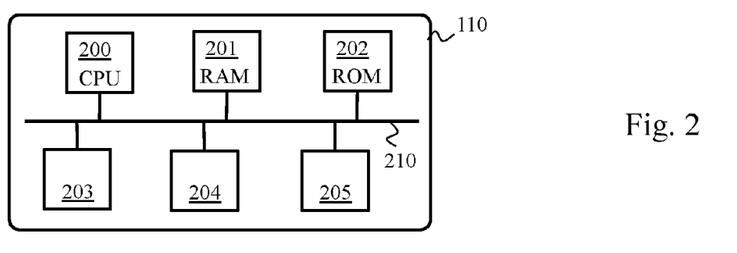
FIG. 2 schematically represents an architecture of a master device of the optical network.

FIG. 2 schematically represents an architecture of the master device 110.

According to the shown architecture, the master device 110 comprises the following components interconnected by a communications bus 210: a processor, microprocessor, microcontroller or CPU (Central Processing Unit) 200; a RAM (Random AccessMemory) 201; a ROM (Read-Only Memory) 202; a device 203 adapted to read information stored on storage means; a first communication interface 204, aiming at being connected to the spectral splitter device 120 for transmitting and receiving optical signals; and, a second communication interface 205, aiming at being connected to the core network.

CPU 200 is capable of executing instructions loaded into RAM 201 from ROM 202 or from any other storage means. After the master device 110 has been powered on, CPU 200 is capable of reading instructions from RAM 201 and executing these instructions. The instructions form one computer program that causes CPU 200 to perform some or all of the steps of the algorithms described hereafter with regard to FIGS. 4, 7 and 8.

It can be noted that the slave devices 141, 142, 143 may also be implemented on the basis of the architecture schematically shown on FIG. 2.

Any and all steps of the algorithms described hereafter with regard to FIGS. 4 to 8 may be implemented in software by execution of a set of instructions or program by a programmable computing machine, such as a DSP (Digital Signal Processor) or a microcontroller; or else implemented in hardware by a machine or a dedicated component, such as an FPGA (Field-Programmable Gate Array) or an ASIC (Application-Specific Integrated Circuit).

Figure 3:
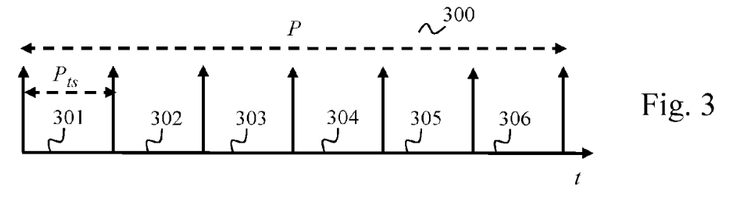
FIG. 3 schematically represents one cycle of a main configuration phase initiated by the master device.

FIG. 3 schematically represents one cycle of the main configuration phase initiated by the master device 110. On FIG. 3, the horizontal line represents time t.

The cycle 300 has a duration P. The cycle 300 is divided into time slots 301, 302, 303, 304, 305, 306. The time slots 301, 302, 303, 304, 305, 306 preferably have the same duration $P_{ts}$. The duration $P_{ts}$ is preferably equal to a round-trip time value RTT that corresponds to the maximum period between a transmission of a request by the master device 110 and a reception of a response to this request from a slave device, whatever the length of the optical fiber between the master device 110 and said slave device. For instance, the specification of the passive optical network 100 indicates the maximum length of the optical fiber between the OLT and any ONU.

In the cycle 300, the first time slot 301 is dedicated to the master device 110 for transmitting signature messages to the slave devices 141, 142, 143. The remaining time slots of the cycle 300 are dedicated to the slave devices 141, 142, 143 for transmitting responses to the signature messages transmitted during the first time slot. As when a slave device needs to transmit a response to the master device 110, this slave device is not aware whether any other slave device will also transmit its response during the same time slot, and collisions may occur. The probability that such collisions occur may be reduced when the lengths of the optical fibers respectively connecting the slave devices 141, 142, 143 to the master device 110 are sufficiently different in view of the propagation speed of the optical signals.

The number of time slots in the cycle 300 may be fixed, or may be dynamically determined by the master device 110. In one embodiment, the duration P may change from one cycle to another. In a particular embodiment, as explained hereafter with regard to FIG. 4, the number of time slots may vary from one cycle 300 to another.

Other arrangements of the cycle 300 may be implemented. For instance, the last time slot of the cycle 300 may be dedicated to the master device 110 for transmitting acknowledgement messages to the slave devices 141, 142, 143. In this case, the duration $P_{ts}$ may be defined as half the RTT value.

It can be noticed that the cycle 300 may start, for each slave device, after it has received the signature message from the master device 110, and the slave devices 141, 142, 143 only consider the time slots 302, 303, 304, 305, 306. In this case, the slave devices 141, 142, 143 may have different representations of the cycle 300. Therefore, the understanding of the time slots definition may differ from one slave device to another. This allows relaxing the time synchronization constraints between the master device 110 and the slave devices 141, 142, 143.

FIG. 4 schematically represents an algorithm, performed by the master device 110 during the main configuration phase, for coarsely determining a transmission configuration to be used by the slave devices 141, 142, 143 for uplink transmissions.

The algorithm starts in a step S401. In a following step S402, the master device 110 sets its first communication interface 204 up. The first communication interface 204 is therefore configured for transmitting optical signals on a carrier wavelength that is substantially equal to the nominal wavelength of the downlink filter 121. The master device 110 may determine a suitable configuration by implementing the algorithm detailed hereafter with regard to FIG. 8. All the messages transmitted by the master device 110 to the slave devices 141, 142, 143 during the main configuration phase are transmitted using this configuration of the first communication interface 204.

The master device 110 further configures the first communication interface 204 to enable receiving optical signals as may be transmitted by the slave devices 141, 142, 143.

In a following step S403, the master device 110 starts a cycle of the main configuration phase, the cycle being defined as aforementioned with regard to FIG. 3.

In a following step S404, the master device 110 transmits a signature message to the slave devices 141, 142, 143. The signature message is a message with a dedicated type identifier indicating that the main configuration phase is on the way. Upon reception of this message, the slave devices 141, 142, 143 act as described hereafter with regard to FIG. 5.

In a following step S405, the master device 110 sets a timer up, with a timeout value that corresponds to the remaining duration of the cycle 300.

In a following step S406, the master device 110 checks whether it receives a response message, from any slave device 141, 142, 143, to the signature message transmitted in the step S404. If the master device 110 received such a response message, a step S408 is performed; otherwise, a step S407 is performed.

In the step S407, the master device 110 checks whether the timeout of the timer set up in the step S405 expired. If the timeout expired, the step S403 is repeated and a new cycle 300 of the main configuration phase is started; otherwise, the step S406 is repeated.

In the step S408, the master device 110 checks whether a collision has been detected resulting from the reception of at least two overlapping response messages from the slave devices 141, 142, 143. In this case, optical signals are received, but the master device 110 is unable to decode the received optical signals. If a collision is detected, a step S409 is performed; otherwise, a step S410 is performed.

In the step S409, the master device 110 transmits a notification message to the slave devices 141, 142, 143 notifying that a collision has been detected. This notification may be included in an acknowledgement message. Then, the step S406 is repeated.

In the step S410, the master device 110 identifies the slave device that has transmitted the response message detected in the step S406, by extracting from the received response message an identifier of the slave device. The master device 110 then transmits an acknowledgement message comprising the extracted identifier. The acknowledgement message may comprise a list of such identifiers, when it acknowledges a plurality of response messages.

In a following step S411, the master device 110 checks whether response messages from all the slaves devices 141, 142, 143 have been received. If all slave devices have been identified, the main configuration phase ends in a step S412. Otherwise, the step S406 is repeated. It has to be noted that the step S406 may not be immediately repeated. The step S406 may be repeated on after a predetermined period of time has elapsed. In addition, the step S406 may be repeated only a predetermined number of times, or for a predetermined period. For instance, if the effective number of slave devices is a priori unknown by the master device 110, the step S406 may be repeated, except if no more response messages have been received for a predefined number of cycles. Many other arrangements of the master device 110 may be made with regard to the signature message retransmission without departing from the scope of the present invention.

When a response message is received from a slave device, the master device 110 may decide to decrease the number of time slots at least for the upcoming cycle 300 of the configuration phase. As less slave devices are subject to transmit messages in response to the upcoming signature message(s), the time period allocated to the transmission of the response messages may be decreased without significantly increasing the probability that collisions occur.

In a particular embodiment, the number of time slots allocated to the transmission of the response messages may be maintained equal to the number of slave devices from which the master device 110 has not yet received any response message.

When a collision is detected, the master device 110 may decide to increase the number of time slots at least for the upcoming cycle 300 of the configuration phase, in order to decrease the probability that another collision occurs.

In another particular embodiment, the cycle 300 is by default defined so that there is one time slot dedicated to the slave devices 141, 142, 143 for transmitting the response messages. If the lengths of the optical fibers respectively connecting the slave devices 141, 142, 143 to the master device 110 are sufficiently different in view of the propagation speed of the optical signals, the probability that a collision occurs is quite low. Therefore, such an arrangement allows reducing the total period of the main configuration phase. In addition, the number of cycles may be increased if a collision is detected.

When the number of time slots per cycle 300 is subject to vary over time, the number of effective time slots in the current cycle may be indicated by the master device 110 in the signature message. In a variant, the master device 110 indicates in the signature message only changes of the number of time slots relatively to a predetermined value, which could be a default value known by each concerned device of the passive optical network 100 or the number of time slots in a preceding cycle 300.

In another embodiment, when the number of time slots per cycle 300 is subject to vary over time, the slave devices 141, 142, 143 determine the number of effective time slots in the current cycle by analysis of the received acknowledgements and/or collision indications.

FIG. 5 schematically represents an algorithm performed by each slave device 141, 142, 143 in correspondence to the algorithm of FIG. 4.

The algorithm starts in a step S501. Let's consider that the algorithm is performed by the slave device 141.

In a following step S502, the slave device 141 configures its first communication interface 204 for transmitting optical signals on an initial carrier wavelength. This initial carrier wavelength corresponds for instance to a default set of transmission parameters stored by the slave device 141 or a set of transmission parameters used for preceding uplink communications. For instance, it may be the set of transmission parameters corresponding to the last carrier wavelength used by the slave device 141 for uplink communications before it has been powered off.

The algorithm of FIG. 5, in conjunction with the algorithm of FIG. 4, aims at configuring the first communication interface 204 for transmitting optical signals on a carrier wavelength that is substantially equal to the nominal wavelength of the uplink filter 122.

In a following step S503, the slave device 141 waits for receiving a signature message from the master device 110. Once the signature message has been received, the slave device 141 selects, in a step S504, a time slot of the cycle 300 in order to transmit a response message to the master device 110. This time slot may be randomly selected, for instance according to a uniform distribution probability.

In a following step S505, the slave device 141 transmits a response message to the master device 110 indicating that the signature message has been received. The response message contains an identifier identifying the slave device 141. It has to be noticed that the first communication interface 204 may not yet be configured for transmitting optical signals on a carrier wavelength in the passband of the uplink filter 122. Therefore, the master device 110 may not receive the response message, as the response message may not be output by the uplink filter 122.

In a following step S506, the slave device 141 sets a timer up, with a timeout value that corresponds to the remaining duration of the time slot. As the duration of the time slot is preferably defined equal to the round-trip time value RTT, if the master device 110 receives the response message, the slave device 141 should then receive an acknowledgment message before the end of the time slot.

In a following step S507, the slave device 141 checks whether it receives an acknowledgement, from the master device 110, consequently to the response message transmitted in the step S505. If the slave device 141 received such an acknowledgement, a step S509 is performed; otherwise, a step S508 is performed. Such an acknowledgement may be an acknowledgement message, as transmitted by the master device 110 in the step S410, or a notification message, notifying that a collision has been detected, as transmitted by the master device 110 in the step S409. Indeed, both types of messages relate to an acknowledgement indicating that the master device 110 received at least one response message, even though it is not able to decode the optical signals in case of collision.

In the step S508, the slave device 141 checks whether the timeout of the timer set up in the step S506 expired. If the timeout expired, a step S511 is performed; otherwise, the step S507 is repeated.

In the step S509, the slave device 141 checks whether the received acknowledgement is an acknowledgement message containing its own identifier. In other words, the slave device 141 checks whether the acknowledgement message acknowledges its own response message. If the acknowledgement message contains the identifier of the slave device 141, it means that the first communication interface 204 of the slave device 141 is configured for transmitting optical signals substantially on the nominal wavelength of the uplink filter 122. Then, a step S512 is performed. Otherwise, a step S510 is performed.

As already mentioned with regard to FIG. 4, the master device may transmit a plurality of acknowledgements in a single message, for instance, at the end of the cycle 300. In this case, the slave device 141 parses the contents of the message in order to check whether it contains its own identifier.

In the step S510, the slave device 141 checks whether it received a notification message notifying that a collision has been detected by the master device 110. If the message indicates a collision detection, the slave device 141 is not able to determine whether its first communication interface 204 is currently configured for transmitting optical signals substantially on the nominal wavelength of the uplink filter 122. Therefore, the step S503 is repeated without any change in the configuration of its first communication interface 204. Otherwise, the step S511 is performed.

In the step S511, the slave device 141 modifies the configuration of its first communication interface 204. In other words, the slave device 141 configures its first communication interface 204 for transmitting optical signals on a new carrier wavelength. The difference between the carrier wavelength of the preceding configuration and the new carrier wavelength may be defined on the basis of the bandwidth of the uplink filter 122. It is preferably smaller than this bandwidth and corresponds for instance to half its value. The purpose of this step is to make the slave device 141 test configurations until it founds a configuration that matches the passband of the uplink filter 122.

In other words, the slave device 141 reconfigures its transmission interface 204 for transmitting optical signals on another carrier wavelength and transmits again the response message, when said slave device 141 doesn't receive from the master device 110 any acknowledgment containing its own identifier nor collision notification between two receptions of signature messages.

In the step S512, the slave device 141 may enter in a process for refining the configuration of its first communication interface 204, in order to get closer to the nominal wavelength of the uplink filter 122. This process is detailed hereafter with regard to FIGS. 6 and 7. Then the algorithm ends in a step S513.

Therefore, the algorithm of FIG. 5 in conjunction with the algorithm of FIG. 4 allows determining a configuration of the slave device 141 for performing uplink communications, whatever is the effective nominal wavelength of the uplink filter 122, especially when this nominal wavelength is temperature dependent.

Therefore, the algorithm of FIG. 5 in conjunction with the algorithm of FIG. 4 also allows determining a configuration of the slave device 141 for performing uplink communications, whereas the effective carrier wavelength used by the slave device 141 is not known, especially when this carrier wavelength is temperature dependent.

Figure 6:
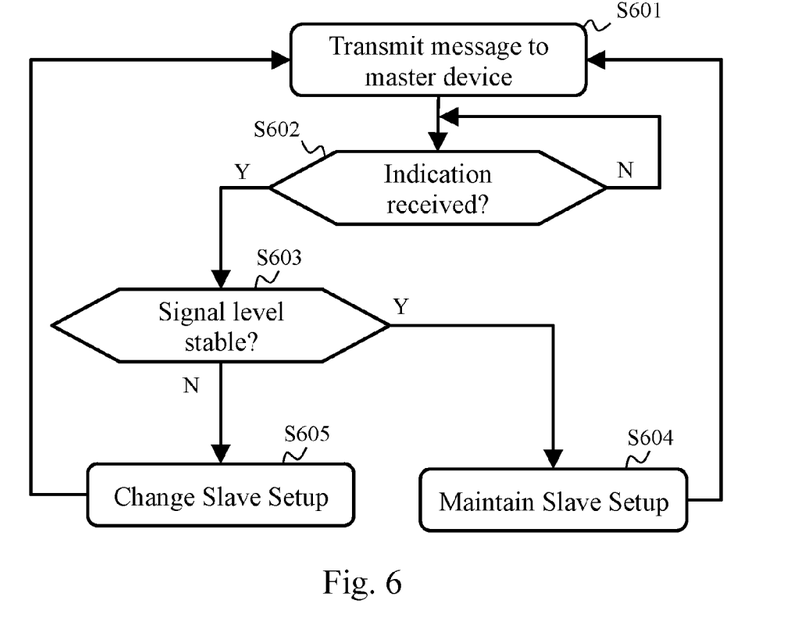
FIG. 6 schematically represents an algorithm, performed by the slave devices during the main configuration phase, for finely determining configurations of their optical transmission interfaces, corresponding to respective carrier wavelengths to be used by said slave devices.

FIG. 6 schematically represents an algorithm, performed by each slave device 141, 142, 143, during the main configuration phase, for finely determining a transmission configuration to be used for uplink communications. Indeed, the algorithm of FIG. 5 allows coarsely determining suitable configurations to be used by the slave devices 141, 142, 143 for uplink communications. However, the configurations of the slave devices 141, 142, 143 can be improved in order to limit the signal attenuations resulting from a slight spectral detuning of the uplink filter 122. In addition, it enables the slave device 141 to track the evolution of the nominal wavelength of the uplink filter 122, due to a change in the temperature of the uplink filter 122, i.e. of the spectral splitter device 120. It further allows the slave device 141 to adapt its transmission configuration when, for a given transmission configuration, the corresponding carrier wavelength changes due to variations of the temperature.

Let's consider that the algorithm is performed by the slave device 141.

In a step S601, the slave device 141 transmits a message to the master device. This message may be part of the usual exchanges between the slave device 141 and the master device 110.

In a following step S602, the slave device 141 checks whether it receives an indication from the master device 110 about the energy level of optical signals detected during the reception of the message transmitted in the step S601. Indeed, as described hereafter with regard to FIG. 7, when receiving a message from a slave device, the master device 110 returns to the slave device an indication about the energy level of optical signals detected during the reception of the message. Such an indication may be part of messages usually exchanged between the master device 110 and the slave devices, for instance in a dedicated message header field.

In a following step S603, the slave device 141 checks whether the indication received from the master device 110 indicates that the energy level of the optical signals is stable compared to a preceding message. The preceding message refers to a preceding execution of the step S601. In a preferred embodiment, the preceding message refers to the message transmitted by the slave device 141 during the immediately preceding execution of the algorithm of FIG. 6. If this is the first execution of the algorithm of FIG. 6, it means that no preceding message exists, the indication is no information and the slave device 141 considers that the energy level of the optical signals is not stable. The energy level of the optical signals is considered stable if the difference between the energy level of two successive messages is below a predefined value. In other words, the slave device 141 decides whether reconfiguring its transmission interface 204 for transmitting optical signals on yet another carrier wavelength, on the basis of the information, or indication, received from the master device 110. If the energy level of the optical signals is stable, a step S604 is performed; otherwise, a step S605 is performed.

In the step S604, the slave device 141 maintains the configuration of its first communication interface 204, and the step S601 is repeated.

In the step S605, the slave device 141 modifies the configuration of its first communication interface 204 as follows.

If the indication indicates no information, it means that this is the first execution of the algorithm of FIG. 6. Then, the slave device 141 arbitrarily decides either to increase the carrier wavelength used in the uplink direction or to decrease it.

If the indication indicates an increase of the energy level and if the slave device 141 decreased, in the previous occurrence of the algorithm of FIG. 6, the carrier wavelength used in the uplink direction, then the slave device 141 continues with decreasing the carrier wavelength.

If the indication indicates an increase of the energy level and if the slave device 141 increased, in the previous occurrence of the algorithm of FIG. 6, the carrier wavelength used in the uplink direction, then the slave device 141 continues with increasing the carrier wavelength.

If the indication indicates a decrease of the energy level and if the slave device 141 decreased, in the previous occurrence of the algorithm of FIG. 6, the carrier wavelength used in the uplink direction, then the slave device 141 now increases the carrier wavelength.

If the indication indicates a decrease of the energy level and if the slave device 141 increased, in the previous occurrence of the algorithm of FIG. 6, the carrier wavelength used in the uplink direction, then the slave device 141 now decreases the carrier wavelength.

If the indication indicates a decrease of the energy level and if the slave device 141 isn't modified, in the previous occurrence of the algorithm of FIG. 6, the carrier wavelength used in the uplink direction, then the slave device 141 now decides either to decrease the carrier wavelength or increase it. This decision may be arbitrarily made or by using a predetermined criteria, for instance on the basis of a preceding evolution. This situation occurs when there is change of the temperature of the uplink filter 122 or of the slave device 141. Therefore, the configuration of the first communication interface 204 of the slave device 141 no more matches the nominal wavelength of the uplink filter 122. A refinement of the carrier wavelength used by the slave device 141 in the uplink direction therefore needs to be performed.

In another embodiment, instead of receiving an indication about the stability of the energy level, the slave device 141 receives an information indicating the actual energy level or an information representing such energy level. In this case, the slave device 141 compares this information with the one received during the previous execution of the algorithm of FIG. 6, and is therefore to determine whether the energy level is stable, whether it has increased or decreased.

Figure 7:
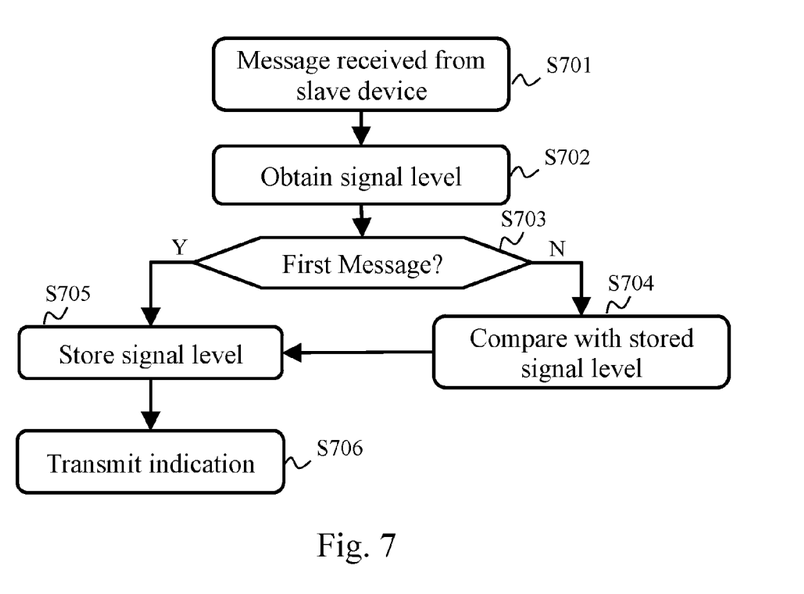
FIG. 7 schematically represents an algorithm performed by the master device in correspondence to the algorithm of FIG. 6.

FIG. 7 schematically represents an algorithm performed by the master device 110 in correspondence to the algorithm of FIG. 6.

In a step S701, the master device 110 receives a message from a slave device, such as the sale device 141. This message corresponds to the one transmitted during the step S601 of the algorithm of FIG. 6. In a following step S702, the master device 110 obtains a value of energy level as measured during the reception of the message.

In a following step S703, the master device 110 checks whether the message is the first one received from this slave device. If this is the first message, a step S705 is performed; otherwise a step S704 is performed.

In the step S704, the master device 110 compares the value of energy level as obtained in the step S702 with a value stored in the step 705 during a preceding execution of the algorithm of FIG. 7.

In the step S705, the master device 110 stores the value of energy level as obtained in the step S702, and in a following step S706, the master device 110 transmits to the slave device an indication relating to the comparison.

If the message received in the step S701 is the first one received from this slave device, the comparison is not performed and the transmitted indication indicates no information. Otherwise, the indication indicates whether the value of energy level of the message is greater, smaller or stable compared to the previously stored value. In other words, the master device 110 indicates whether the energy level of the message is greater, smaller or stable compared to the energy level of the preceding message.

It can be noted that the roles of the master device 110 and of the slave device 141 may be inverted in the execution of the algorithms of FIGS. 6 and 7. In this case, the master device 110 may improve the configuration of its first communication interface 204 in order to limit the signal attenuations resulting from the downlink filter 121. Indeed, the algorithm as described hereafter with regard to FIG. 8 enables the master device to coarsely define a transmission configuration to be used for downlink transmissions. There might be a need to finely define the carrier wavelength. In addition, it would enable the master device 110 to track the evolution of nominal wavelength of the downlink filter 121 due to a change in the temperature of the downlink filter 121, i.e. of the spectral splitter device 120. It would further allow the master device 110 to adapt its transmission configuration when, for a given transmission configuration, the corresponding carrier wavelength varies, for instance due to variations of the temperature.

Figure 8:
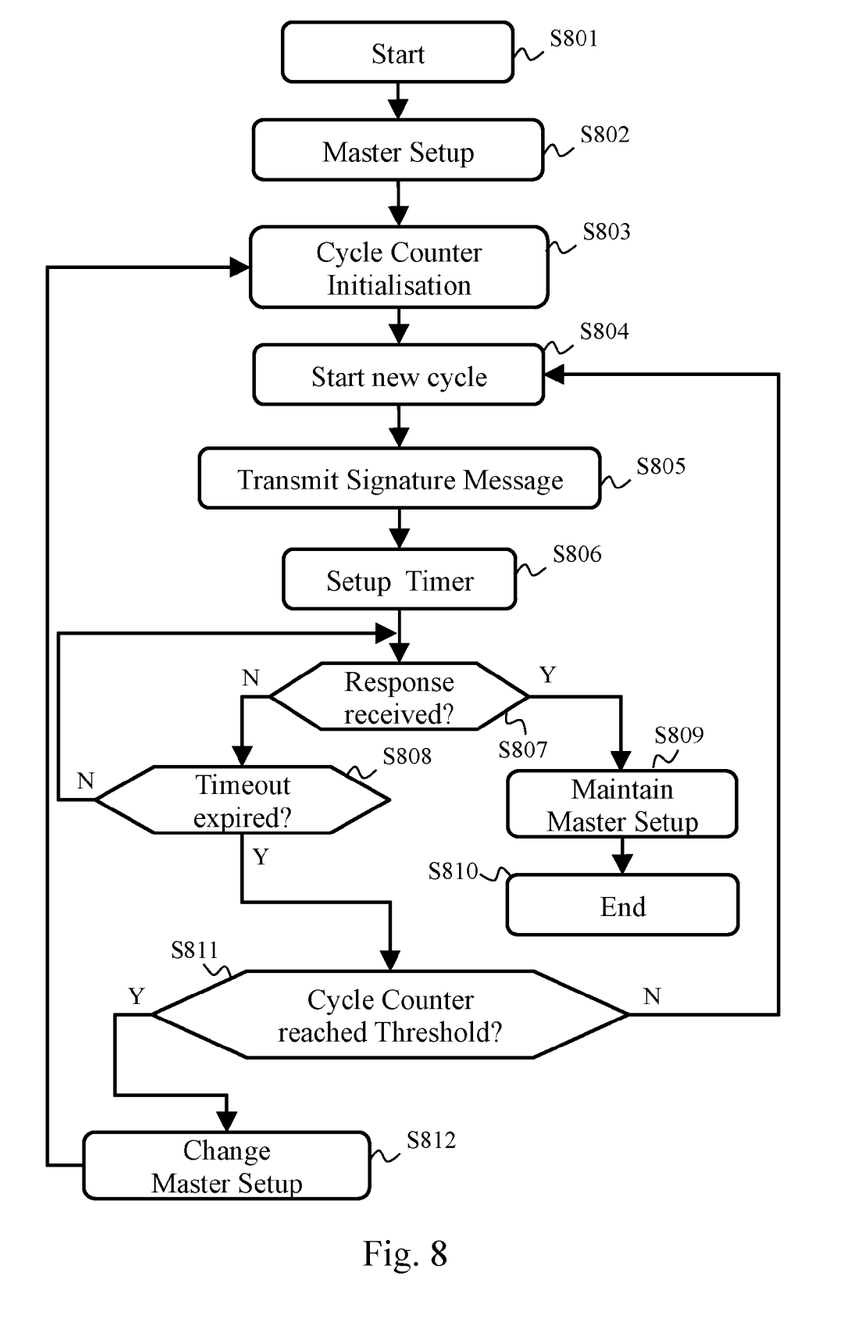
FIG. 8 schematically represents an algorithm, performed by the master device during a preliminary configuration phase, for determining a configuration of its optical transmission interface, corresponding to a carrier wavelength to be used by said master device.

FIG. 8 schematically represents an algorithm, performed by the master device 110 during the preliminary configuration phase, for determining a transmission configuration to be used in the downlink direction.

The algorithm starts in a step S801. In a following step S802, the master device 110 sets its first communication interface 204 up. The first communication interface 204 is therefore configured for transmitting optical signals on an initial carrier wavelength, which may be a default configuration of the first communication interface 204 or a configuration of the first communication interface 204 previously used for downlink communications with the slave devices 141, 142, 143.

The master device 110 further configures the first communication interface 204 to enable receiving optical signals as may be transmitted by the slave devices 141, 142, 143.

In a following step S803, the master device 110 initializes a cycle counter. This cycle counters aims at counting the number of cycles of the preliminary configuration phase. Therefore, the cycle counter is incremented at each new cycle. As the master device 110 may perform the preliminary configuration phase with only one slave device, the number of time slots per cycle in the preliminary configuration phase may be reduced compared to the number of time slots per cycle in the main configuration phase. For instance, each cycle may comprise two time slots, one for the transmission of the signature message and one for the transmission of the response message and of the acknowledgement message.

In a following step S804, the master device 110 starts a cycle of the preliminary configuration phase.

In a following step S805, the master device 110 transmits a signature message to the slave devices 141, 142, 143. The signature message is a message with a dedicated type identifier indicating that the preliminary configuration phase is on the way. This type identifier may be the same as the one used for the main configuration phase. Upon reception of this message, the slave devices 141, 142, 143 transmit a response message as already described with regard to FIG. 5. It has to be noticed that the first communication interface 204 may not yet be configured for transmitting optical signals on a carrier wavelength in the passband of the downlink filter 121. Therefore, the slave devices 141, 142, 143 may not receive the signature message, as the signature message may not be output by the downlink filter 121.

In a following step S806, the master device 110 sets a timer up, with a timeout value that corresponds to the remaining duration of the cycle.

In a following step S807, the master device 110 checks whether it receives a response message, from any slave device 141, 142, 143, to the signature message transmitted in the step S805. If the master device 110 received such a response message, it means that the first communication interface 204 of the master device 110 is configured for transmitting optical signals substantially on the nominal wavelength of the downlink filter 121. Then, a step S809 is performed. Otherwise, a step S808 is performed.

In the step S809, the master device 110 maintains the configuration of its first communication interface 204. Indeed, when the algorithm reaches this step, it means that the slave devices 141, 142, 143 are able to receive messages from the master device 110. The master device 110 may refine the configuration of its first communication interface 204, as already mentioned with regard to FIG. 7. Then, the algorithm ends in a step S810.

In the step S808, the master device 110 checks whether the timeout of the timer set up in the step S806 expired. If the timeout expired, a step S811 is performed; otherwise, the step S807 is repeated.

In the step S811, the master device 110 checks whether the cycle counter reached a predetermined threshold. In other words, the master device 110 checks whether a predetermined number, or threshold, of transmitted signature messages is reached. This threshold corresponds to the maximum number of cycles necessary for a slave device to find a suitable configuration of its own first communication interface 204. Indeed, if a slave device receives the signature message, it then needs to find the suitable configuration for the uplink communications. To achieve this, the slave device applies the algorithm already described with regard to FIG. 5. Therefore, the master device 110 shall send as many signature messages as may be necessary for the slave device to find out a suitable transmission configuration for uplink communications. If the threshold is reached, a step S812 is performed. Otherwise, the step S804 is repeated and a new cycle is started.

In the step S812, the master device 110 modifies the configuration of its first communication interface 204. In other words, the master device 110 configures its first communication interface 204 for transmitting optical signals on a new carrier wavelength. The difference between the preceding transmission configuration and the new transmission configuration may be defined on the basis of the bandwidth of the downlink filter 121. It is preferably smaller than this bandwidth and corresponds for instance to half its value. The purpose of this step is to make the master device 110 test configurations until it founds a configuration that matches the passband of the downlink filter 121.

Once the master device 110 has found a suitable configuration for the downlink filter 121, it is able to determine suitable configurations of the other downlink filters of the spectral splitter device 120. Indeed, as already mentioned, for a considered uplink or downlink direction, all the filters of the spectral splitter device 120 have preferably the same bandwidth value and are preferably spaced by a predetermined spectral distance, independently of the variations of temperature. The master device 110 is therefore able to determine suitable configurations of the other downlink filters by using this bandwidth and space values.

The bandwidth of the filters may be fixed, as well as the spectral distance between filters. In a variant, the effective bandwidth for each filter and the spectral distances between filters may be learnt by the master device 110. In this case, the master device 110 performs the steps of the algorithm detailed above with regard to FIG. 4 for each downlink filter, and determines from the obtained configuration the effective bandwidths and spectral distances. As these characteristics are not subject to change with the temperature, they can be used by the master device 110 to shorten the preliminary configuration phases for all the filters in the future.

The invention claimed is:
1. A method for configuring an optical transmission interface of at least one first device for transmitting optical signals on at least one respective path to a second device on a carrier wavelength substantially equal to a nominal wavelength of a first optical band-pass filter present on the at least one path, each first device including an optical reception interface configured to enable receiving optical signals from the second device, the second device including an optical reception interface configured to enable receiving optical signals output by said first optical band-pass filter and transmitted by any first device on a carrier wavelength substantially equal to said nominal wavelength, the optical transmission interface of each first device being initially configured for transmitting optical signals on a first carrier wavelength, wherein the second device performs:
  transmitting signature messages to the at least one first device;
  transmitting an acknowledgement to each response message received in response to the transmitted signature messages;
and wherein each first device performs:
  receiving at least one signature message from the second device;
  transmitting, to the second device, a response message to each received signature message; and
  reconfiguring its optical transmission interface for transmitting optical signals on another carrier wavelength, when the first device does not receive from the second device an acknowledgement between two receptions of signature messages.

2. The method according to claim 1, wherein the second device further performs transmitting an indication of a collision of response messages, when said second device detects said collision, and each first device that has not received an acknowledgement between two receptions of signature messages performs transmitting the next response message without reconfiguring its optical transmission interface.

3. The method according to claim 1, wherein the second device transmits in a single acknowledgement message a plurality of acknowledgements to respective response messages.

4. The method according to claim 1, wherein each transmission of a signature message corresponds to the starting point of a cycle, each cycle is divided into time slots, and each response message to said signature message is transmitted during a predetermined time slot.

5. The method according to claim 4, wherein the second device further performs:
  decreasing a number of time slots of at least one following cycle according to a number of received responses; and
  increasing the number of time slots of the at least one following cycle, when the second device detects a collision between response messages.

6. The method according to claim 1, wherein, once at least one first device has received an acknowledgement to its response message, said first device performs:
  transmitting messages to the second;
  receiving an information related to optical signals energy level detected by the second device when receiving the messages; and
  deciding whether reconfiguring its optical transmission interface with yet another carrier wavelength, on the basis of the received information.

7. The method according to claim 6, wherein the information indicates whether the optical signals energy level increased, decreased, or was stable when comparing the optical signals energy level detected when receiving one message and the optical signals energy level detected when receiving one preceding message.

8. The method according to claim 1, a second optical band-pass filter being present on the at least one path from the second device to the at least one first device, the second device including an optical transmission interface configured for transmitting optical signals on a carrier wavelength substantially equal to the nominal wavelength of said second optical band-pass filter, wherein, once the second device has received a response message from a slave device, the second device further performs:
  transmitting messages to the first device;
  receiving an information related to optical signals energy level detected by the first device when receiving said messages; and
  deciding whether reconfiguring its optical transmission interface with another carrier wavelength, on the basis of the received information.

9. The method according to claim 1, a second optical band-pass filter being present on the at least one path from the second device to the at least one first device, the second device having an optical transmission interface configured for transmitting optical signals on a second carrier wavelength, wherein the second device further performs:
  checking whether a predetermined number of signature messages transmitted to the at least one first device is reached;
  and in case of positive result of the checking step:
  reconfiguring its optical transmission interface for transmitting optical signals on another carrier wavelength and transmitting at least one signature message via its reconfigured optical transmission interface.

10. The method according to claim 1, a second optical band-pass filter being present on the at least one path from the second device to the at least one first device, the second device having an optical transmission interface to be configured for transmitting optical signals to the at least one first device, wherein the second device further performs:
  determining a configuration for transmitting optical signals on a wavelength substantially equal to the nominal wavelength of a third optical band-pass filter on a path from the second device to a third device; and
  configuring its optical transmission interface on the basis of the determined configuration and of a predetermined spectral distance between the nominal wavelength of said second optical band-pass filter and the nominal wavelength of said third optical band-pass filter.

11. A system for configuring an optical transmission interface of at least one first device for transmitting optical signals on at least one respective path to a second device on a carrier wavelength substantially equal to a nominal wavelength of a first optical band-pass filter present on the at least one path, each first device having an optical reception interface configured to enable receiving optical signals from the second device, the second device having an optical reception interface configured to enable receiving optical signals output by said first optical band-pass filter and transmitted by any first device on a carrier wavelength substantially equal to said nominal wavelength, the optical transmission interface of each first device being initially configured for transmitting optical signals on a carrier wavelength, the system comprising the at least one first device and said second device, wherein the second device comprises:
  means for transmitting signature messages to the first device(s);
  means for transmitting an acknowledgement to each response message received in response to the signature messages;
and wherein each first device comprises:
  means for receiving at least one signature message from the second device;

means for transmitting, to the second device, a response message to each received signature message; and means for reconfiguring its optical transmission interface for transmitting optical signals on another carrier wavelength, said means being implemented when said first device doesn't receive from the second device an acknowledgement between two receptions of signature messages.

12. A method for configuring an optical transmission interface of a first device for transmitting optical signals on a path to a second device on a carrier wavelength substantially equal to a nominal wavelength of a first optical band-pass filter present on the path, the first device having an optical reception interface configured to enable receiving optical signals from the second device, the optical transmission interface of the first device being initially configured for transmitting optical signals on a carrier wavelength, wherein the first device performs:

receiving at least one signature message from the second device;

transmitting, to the second device, a response message to each received signature message; and reconfiguring its optical transmission interface for transmitting optical signals on another carrier wavelength, when the first device does not receive from the second device an acknowledgement to a response message between two receptions of signature messages.

13. A device having an optical transmission interface to be configured for transmitting optical signals on a path to a second device on a carrier wavelength substantially equal to a nominal wavelength of an optical band-pass filter present on the path, the first device having an optical reception interface configured to enable receiving optical signals from the second device, the optical transmission interface of the first device being initially configured for transmitting optical signals on a carrier wavelength, wherein the first device comprises:

means for receiving at least one signature message from the second device;

means for transmitting, to the second device, a response message to each received signature message; and means for reconfiguring its optical transmission interface for transmitting optical signals on another carrier wavelength, the means being implemented when the first device does not receive from the second device an acknowledgement to a response message between two receptions of signature messages.

14. A method for configuring an optical transmission interface of at least one first device for transmitting optical signals on at least one respective path to a second device on a carrier wavelength substantially equal to a nominal wavelength of an optical band-pass filter present on the at least one path, the second device having an optical reception interface configured to enable receiving optical signals output by the first optical band-pass filter and transmitted by any first device on a carrier wavelength substantially equal to the nominal wavelength, the nominal wavelength of the optical band-pass filter being previously unknown to the first and second devices, wherein the second device performs:

transmitting signature messages to the at least one first device; and transmitting an acknowledgement to each response message received in response to the transmitted signature messages.

15. A device for configuring an optical transmission interface of at least one first device for transmitting optical signals on at least one respective path to the second device on a carrier wavelength substantially equal to a nominal wavelength of an optical band-pass filter present on the at least one path, the second device having an optical reception interface configured to enable receiving optical signals output by the optical band-pass filter and transmitted by any first device on a carrier wavelength substantially equal to said nominal wavelength, the nominal wavelength of the optical band-pass filter being previously unknown to the first and second devices, wherein the second device comprises:

means for transmitting signature messages to the at least one first device; and means for transmitting an acknowledgement to each response message received in response to the transmitted signature messages.

* * * * *